United States Patent
Okamoto et al.

(10) Patent No.: US 6,224,837 B1
(45) Date of Patent: May 1, 2001

(54) EXHAUST GAS PROCESSING APPARATUS

(75) Inventors: Masaru Okamoto, Kawasaki; Katsuya Okamura, Inagi; Choji Yamazaki, Ome; Hiroyuki Yasui, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/300,392

(22) Filed: Apr. 27, 1999

(51) Int. Cl.[7] .................... B01J 19/08; B01J 19/12
(52) U.S. Cl. ................... 422/186.04; 422/186.23
(58) Field of Search ............ 422/186.04, 186.21, 422/186.07, 186.08, 186.23; 204/164; 60/275

(56) References Cited

U.S. PATENT DOCUMENTS

| | | | | |
|---|---|---|---|---|
| 5,637,198 | * | 6/1997 | Breault | 204/165 |
| 5,746,051 | * | 5/1998 | Kieser et al. | 60/275 |
| 5,785,932 | * | 7/1998 | Helfritch | 422/186.04 |
| 5,828,101 | * | 10/1998 | Endo | 257/330 |
| 5,942,195 | * | 8/1999 | Lecca et al. | 422/174 |

FOREIGN PATENT DOCUMENTS

| | | |
|---|---|---|
| 5-59934 | 3/1993 | (JP) . |
| 7-139388 | 5/1995 | (JP) . |
| 8-14028 | 1/1996 | (JP) . |

* cited by examiner

Primary Examiner—Kathryn Gorgos
Assistant Examiner—Wesley A. Nicolas
(74) Attorney, Agent, or Firm—Oblon, Spivak, McClelland, Maier & Neustadt, P.C.

(57) ABSTRACT

In an exhaust gas processing apparatus for an internal combustion engine, supply power is fed to a corona discharge tube via a short-pulse high-repetition switching element to produce a corona. A harmful substance in exhaust gas of the internal combustion engine is removed by the corona. An MAGT (MOS Assisted Gate-Triggered Thyristor) is used as the short-pulse high-repetition switching element. Thus, the life of the switching element is increased and a high purification performance is achieved even at the time of start of operation when the temperature of exhaust gas is low.

8 Claims, 5 Drawing Sheets

EXHAUST GAS PROCESSING APPARATUS

BACKGROUND OF THE INVENTION

1. Field of the Invention

The present invention relates to an exhaust gas processing apparatus for purifying an exhaust gas produced from an internal combustion engine.

2. Discussion of the Background

An electric discharge denitration apparatus (Jpn. Pat. Appln. KOKAI Publication No. 5-59934) shown in FIG. 1, an electric discharge denitration/dedusting apparatus (Jpn. Pat. Appln. KOKAI Publication No. 7-139338) shown in FIG. 2 and an electric discharge exhaust gas purifying apparatus (Jpn. Pat. Appln. KOKAI Publication No. 8-14028) are known as examples of the prior art for achieving a high purification performance even at the time of the start of operation of an internal combustion engine, wherein the electron temperature in exhaust gas is raised by means of a corona discharge and a catalyst is used together.

The electric discharge denitration apparatus 1 in FIG. 1 includes a discharge electrode 3 formed of a tungsten wire element 2, and a cylindrical receiving electrode 4. The discharge electrode 3 is disposed along a central axis of the cylindrical receiving electrode 4. The discharge electrode 3 is used as a cathode and the receiving electrode 4 as an anode. A high DC voltage is applied between the discharge electrode 3 and receiving electrode 4, an electric field is produced in a space 5 between both electrodes 3 and 4.

If exhaust gas to be processed is let into the receiving electrode 4, nitrogen oxides, hydrocarbons, etc. in the exhaust gas are electrified with negative ions 6 and adsorbed and decomposed by the receiving electrode 4. The exhaust gas is thus purified.

In the electric discharge denitration/dedusting apparatus in FIG. 2, exhaust gas 7 produced from a diesel engine for driving a generator is passed through a discharge tube 8 formed as a module, during which time the exhaust gas 7 is purified by atomized oil 9 and a corona discharge 13 applied by an AC power supply 12 between an external electrode 10 and a central electrode 11. On the basis of a detection output value of an exhaust gas sensor, the magnitude and frequency of an application voltage to the discharge tube 8 are varied for each discharge tube module.

The electric discharge exhaust gas purifying apparatus in FIG. 3 includes a receiving electrode 14 and a discharge electrode 15. The receiving electrode 14 is coated with a catalyst. Harmful components activated by electric discharge come in contact with the catalyst, and thus the rate of reaction for removing harmful matter is increased.

In the above prior-art apparatuses, one of the discharge electrodes is disposed in parallel to the direction of flow of exhaust gas, or the catalyst is divided and a voltage is applied therebetween.

In the above-described conventional method in which the corona discharge and catalyst are combined in use, it is necessary to create a non-equilibrium state in which the electron temperature is higher than the nucleus temperature. For this purpose, it is required to reduce the pulse width of electric current to about 100 ns or less and to cut off the current before electrons accelerated by an electric field deliver energy to atomic nuclei to enter an equilibrium state. In addition, it is necessary to set the frequency of pulses at 1 kHz or higher.

A thyratron, or one of vacuum tubes, is known as a device capable of performing such high-speed switching. The thyratron, though capable of performing high-speed switching, is not practical since its life as a high-speed switching device is about one month at most. An IGBT (Insulated Gate Bipolar Transistor) is widely used as a long-life, high-speed switching semiconductor device. The pulse width of this device, however, is merely about several-hundred ns and is unsatisfactory as a device for use in purifying exhaust gas.

Under the circumstances, there is a demand for an exhaust gas processing apparatus using a long-life, short-pulse high-repetition switching device, thereby achieving a high purification performance even when the temperature of exhaust gas is low at the time of the start of operation.

In general, in the above-described conventional methods in which the corona discharge and catalyst are combined in use, one of the discharge electrodes is disposed in parallel to the direction of flow of exhaust gas, or the catalyst is divided and a voltage is applied therebetween.

Where the electrode is disposed in parallel to the direction of flow of exhaust gas, an insulating member serving as an electrode support prevents a gas flow. As a result, the processing efficiency deteriorates, or serial connection for enhancing the purifying performance becomes difficult. On the other hand, where the catalyst is divided, the flow of discharged electrons does not traverse the exhaust gas and thus the electrons are not efficiently supplied into the exhaust gas.

It is thus desired that an exhaust gas processing apparatus with an enhanced exhaust gas purifying performance, wherein the electrode support does not prevent the flow of exhaust gas, be presented.

BRIEF SUMMARY OF THE INVENTION

Accordingly, it is an object of the present invention to provide an exhaust gas processing apparatus using a long-life, short-pulse high-repetition switching device, thereby achieving a high purification performance even when the temperature of exhaust gas is low at the time of the start of operation.

It is another object of the invention to provide an exhaust gas processing apparatus with an enhanced exhaust gas purifying performance, wherein an electrode support does not prevent the flow of exhaust gas.

According to an aspect of the invention, there is provided an exhaust gas processing apparatus for removing a predetermined component contained in exhaust gas of an internal combustion engine, the apparatus including: a corona discharge tube in which the exhaust gas of the internal combustion engine is introduced; and a switching element composed of a MAGT (MOS Assisted Gate-Controlled Thyristor) used for supplying supply power to the corona discharge tube.

In the exhaust gas processing apparatus, the internal combustion engine may be a diesel engine.

In the exhaust gas processing apparatus, the internal combustion engine may be a gasoline engine.

According to another aspect of the invention, there is provided an exhaust gas processing apparatus for removing a predetermined component contained in exhaust gas of an internal combustion engine, the apparatus including: a corona discharge tube for causing a corona discharge between a high-voltage electrode and a ground electrode and activating the exhaust gas, the high-voltage electrode being disposed in a direction crossing a direction of flow of the exhaust gas; and a catalyst section for purifying the exhaust gas activated by the corona discharge section.

In this exhaust gas processing apparatus, the high-voltage electrode may be disposed perpendicular to the direction of flow of the exhaust gas.

In the exhaust gas processing apparatus, the ground electrode may be disposed in an axial direction of the high-voltage electrode on each of four sides of the high-voltage electrode.

In the exhaust gas processing apparatus, the catalyst section may be disposed downstream of the corona discharge section in the direction of low of the exhaust gas, and a plurality of combinations of the corona discharge section and the catalyst section may be connected in tandem and closely attached to one another.

In the exhaust gas processing apparatus, a catalyst carrier in the catalyst section may be formed of one of a metal and an electrically conductive ceramic material.

In the exhaust gas processing apparatus, a plurality of small projections may be formed on at least one of the high-voltage electrode and the ground electrode.

In the exhaust gas processing apparatus, the corona discharge section and the catalyst section may be surrounded by a housing, and the housing may be formed of an electromagnetic shield member formed by laminating a magnetic shield material and a higher electrical conductivity material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Embodiments of the present invention will now be described with reference to the accompanying drawings.

Figure 1:
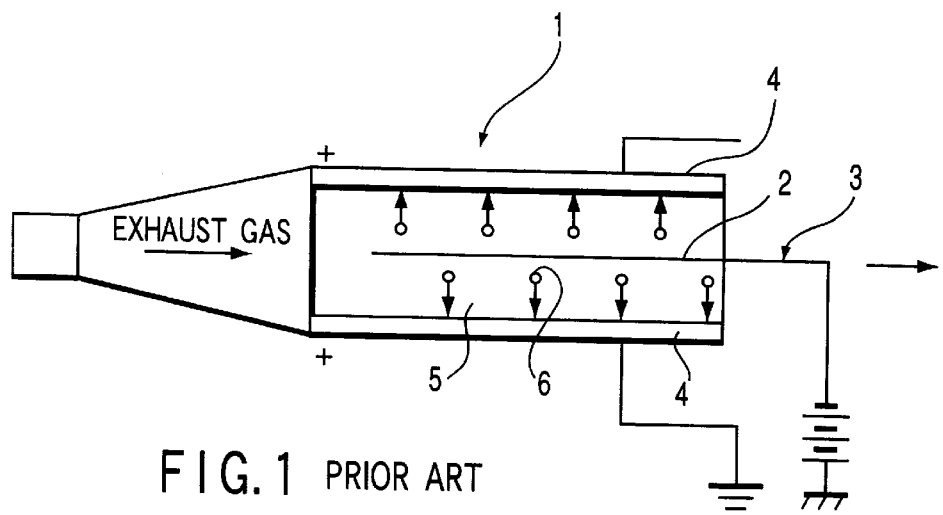
FIG. 1 shows the structure of an exhaust gas processing apparatus according to a first example of prior art.
Figure 2:
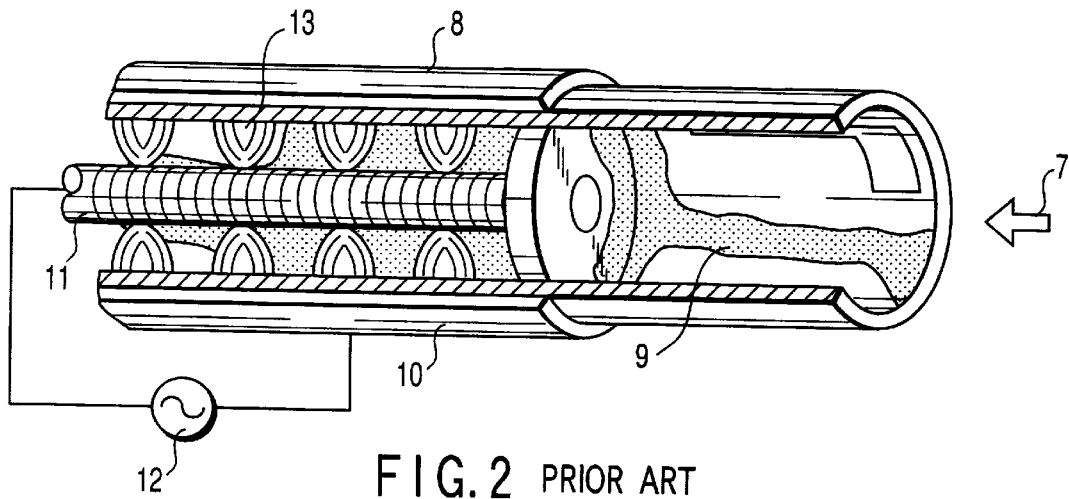
FIG. 2 is a cross-sectional perspective view showing an exhaust gas processing apparatus according to a second example of prior art.
Figure 3:
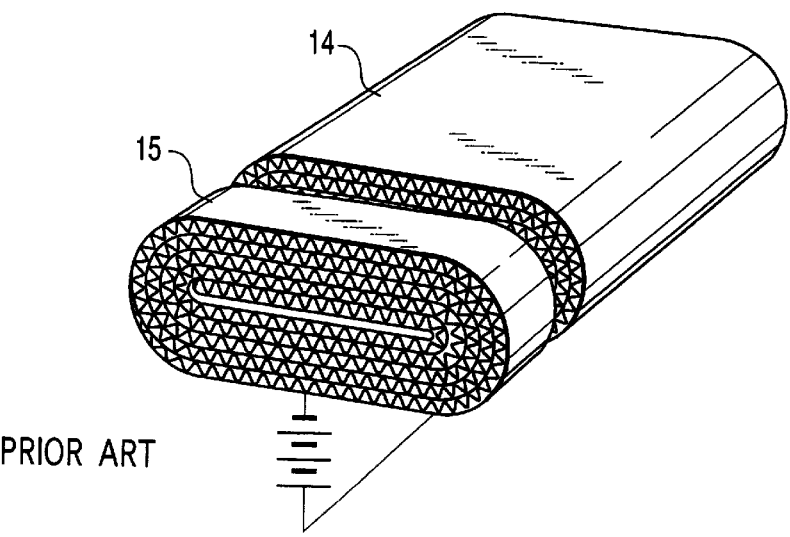
FIG. 3 is a perspective view showing an exhaust gas processing apparatus according to a third example of prior art.
Figure 4:
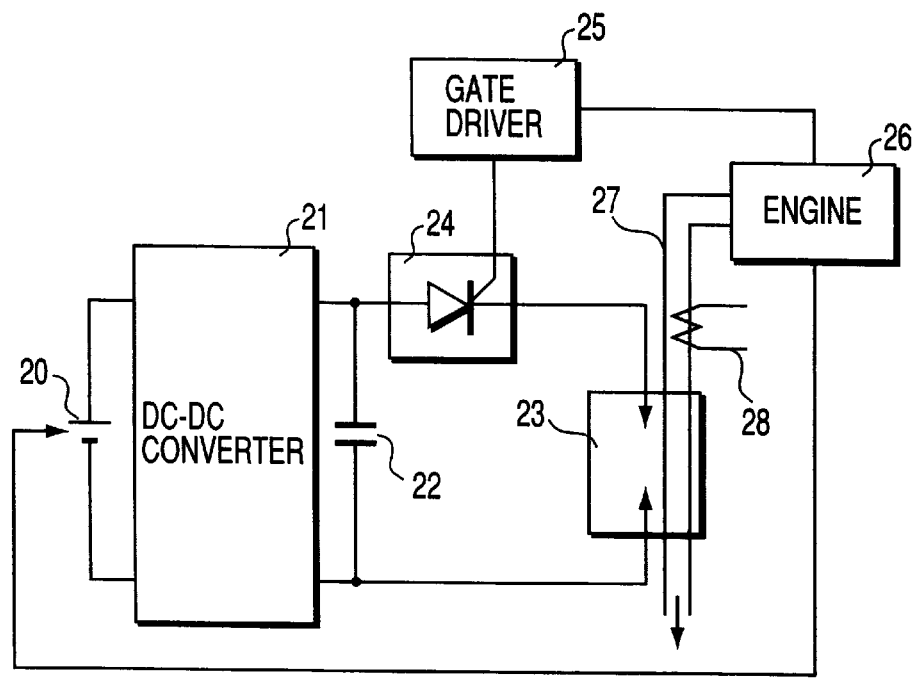
FIG. 4 is a circuit diagram showing an exhaust gas processing apparatus according to a first embodiment of the present invention.

FIG. 4 is a circuit diagram showing an exhaust gas processing apparatus according to a first embodiment of the present invention.

As is shown in FIG. 4, a power supply circuit of the exhaust gas processing apparatus of this embodiment has a battery 20. A DC power produced from a generator (an alternator) (not shown), which is provided on an engine 26, is accumulated in the battery 20.

A DC-DC converter 21, a capacitor 22 and a corona discharge tube 23 functioning as a reaction device are connected in parallel to the battery 20. An MAGT (MOS Assisted Gate-Triggered Thyristor) 24 serving as a short-pulse high-repetition switching device is connected between the corona discharge tube 23 and capacitor 22. A gate of the MAGT 24 is connected to a gate driver 25.

The corona discharge tube 23 is connected to an exhaust pipe 27 of the engine 26. A temperature measurement device 28 is provided at that portion of the exhaust pipe 27, which is located near the inlet of the corona discharge pipe 23. A high-responsiveness infrared temperature gauge or a thermocouple is used as the temperature measurement device 28.

Figure 5A:
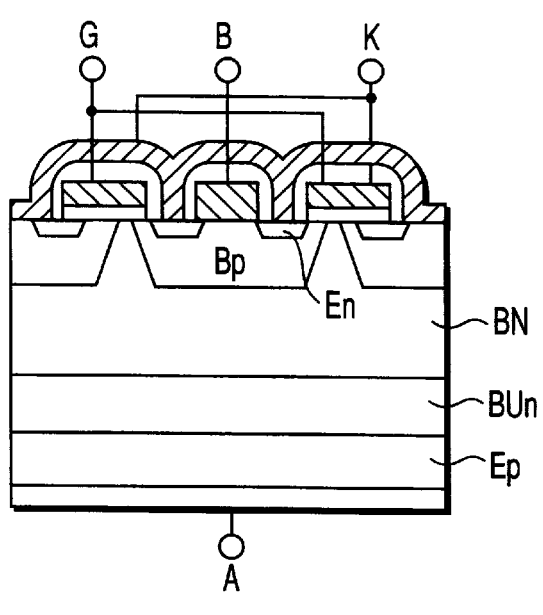
FIGS. 5A and 5B show a basic structure and an equivalent circuit of an MAGT (MOS Assisted Gate-Triggered Thyristor)
Figure 5B:
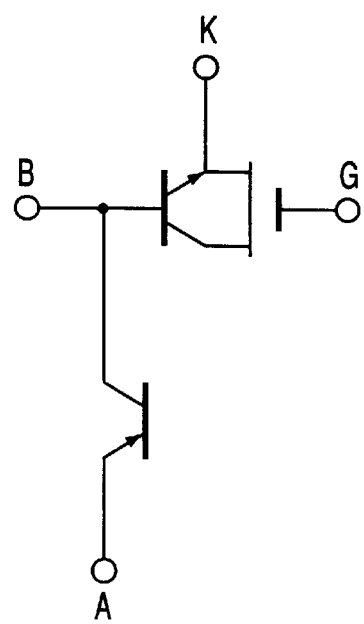

FIGS. 5A and FIG. 5B show a basic structure and an equivalent circuit of the MAGT 24. As shown in FIGS. 5A and 5B, the MAGT 24 has such a configuration that an n-channel MOSFET is incorporated between an n-emitter En and an n-base Bn of a thyristor structure. The MAGT 24 is a compound functional device having a high-power switching performance of a thyristor and a high-speed turn-on performance of a MOSFET.

The MAGT 24 is turned on by applying a positive voltage to a gate G and turning on the MOSFET. If a negative bias voltage is applied to a base B, which is provided aside from the gate G, after current is conducted, a residual charge is let out of the device in a short time and the dV/dt withstand quantity can be increased.

When the MAGT 24 is turned on, electrons are directly injected in the n-base Bn via the MOSFET from a cathode K. Compared to a conventional thyristor, carrier accumulation in the n-base Bn is effected more quickly and high-speed turn-on can be achieved. Moreover, in the MAGT 24, the thickness of a p-base Bp is optimized to enhance the efficiency of carrier injection from an n-emitter En to an n-base Bn. Thereby, carrier accumulation in the n-base Bn is facilitated and turn-on characteristics are enhanced. In FIGS. 5A and 5B, symbol A denotes an anode, BUn an n-buffer, and Ep a p-emitter.

Accordingly, the MAGT 24 is a semiconductor device which can produce high voltage, high current and short pulses and has a high-speed performance of the MOSFET and a high current conduction performance of the thyristor. The MAGT 24 is a high-power device capable of switching with a start-up time of 100 ns or less and a repetition frequency of about 5 kHz, and its life is semipermanent.

The operation of the present embodiment will now be described with reference to FIG. 4.

A DC power produced from the generator (alternator) (not shown) provided on the engine 26 is accumulated in the battery 20. The DC power from the battery 20 is boosted by the DC-DC converter 21 and temporarily stored in the capacitor 22.

The gate driver 25 is provided with a microcomputer for controlling the number (frequency) of pulses on the basis of an output signal from the engine 26 and a signal from the temperature measurement device 28 provided on the exhaust pipe 27. The microcomputer is programmed to set a necessary and sufficient number (frequency) of pulses for removing a predetermined amount of nitrogen oxides from exhaust gas.

The MAGT 24 performs a switching operation in accordance with an output from the gate driver 25 and supplies power from the capacitor 22 to the corona discharge tube 23. If exhaust gas to be processed is let in the corona discharge tube 23, the exhaust gas is set in a non-equilibrium state in which the electron temperature is higher than the atomic nucleus temperature, and the exhaust gas is purified by a catalyst provided in a rear stage (not shown).

According to the present embodiment, since the output from the engine 26 and the temperature of exhaust gas are used for controlling the number (frequency) of pulses of the power supply, a necessary and sufficient power for removing a predetermined amount of harmful substance such as nitrogen oxides can be supplied to the reaction device 23. Therefore, efficient exhaust purification can be performed.

Since the MAGT 24, which is a very-short-pulse, high-repetition, higher power device is used as a short-pulse, high-repetition switching section, the life of the switching section can be increased. Moreover, since the power supply circuit is entirely composed of solid-state devices, a small-sized, highly reliable device can be provided. Accordingly, the power supply circuit can be applied to a vehicle having only a limited installation space and suffering great vibrations.

Figure 6:
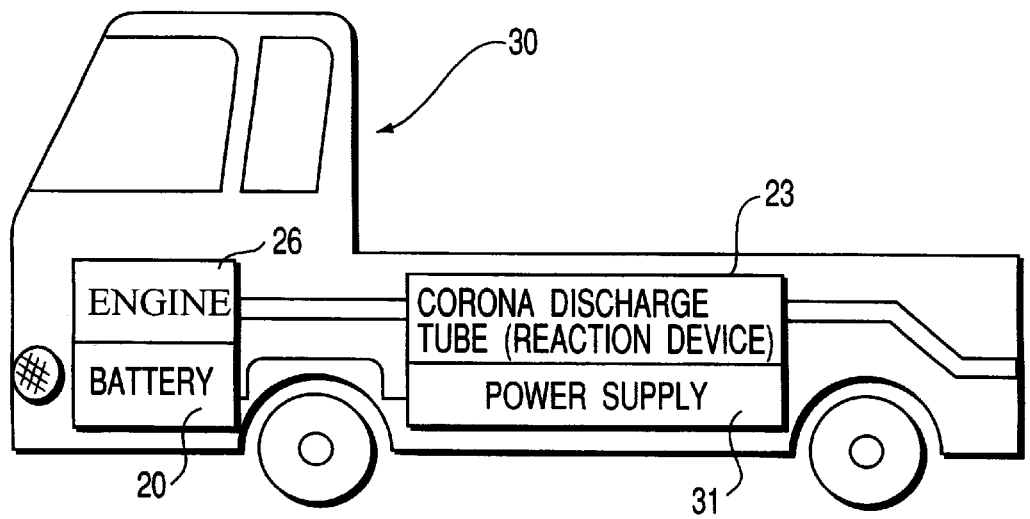
FIG. 6 schematically shows a vehicle to which a power supply circuit of the exhaust gas processing apparatus shown in FIG. 4 is applied.

FIG. 6 schematically shows a vehicle to which the power supply circuit of the exhaust gas processing apparatus shown in FIG. 4 is applied. In this example, a truck 30 is chosen as the vehicle. In the truck 30, the power supply circuit of the exhaust gas processing apparatus shown in FIG. 4 is provided and a diesel engine is mounted as the engine 26 or the internal combustion engine.

Accordingly, with the power supply circuit of the exhaust gas processing apparatus shown in FIG. 4 applied to the truck with the Diesel engine, a contribution is made toward preventing air pollution.

In the above example, the truck was chosen as the vehicle, but the same advantage can be obtained even if a bus, etc. is chosen. It is desirable that a power supply 31 for exhaust gas purification be provided near the corona discharge tube 23 serving as the reaction device, in order to reduce the inductance of the discharge circuit.

Besides, in the example of FIG. 6, the first embodiment is applied to the diesel engine mounted in the vehicle such as a truck or a bus. However, the first embodiment can be applied to other vehicles such as passenger cars with gasoline engines mounted as internal combustion engines. In this case, a required purification performance can be obtained even at the time of start of operation when the temperature of exhaust gas is low.

Figure 7:
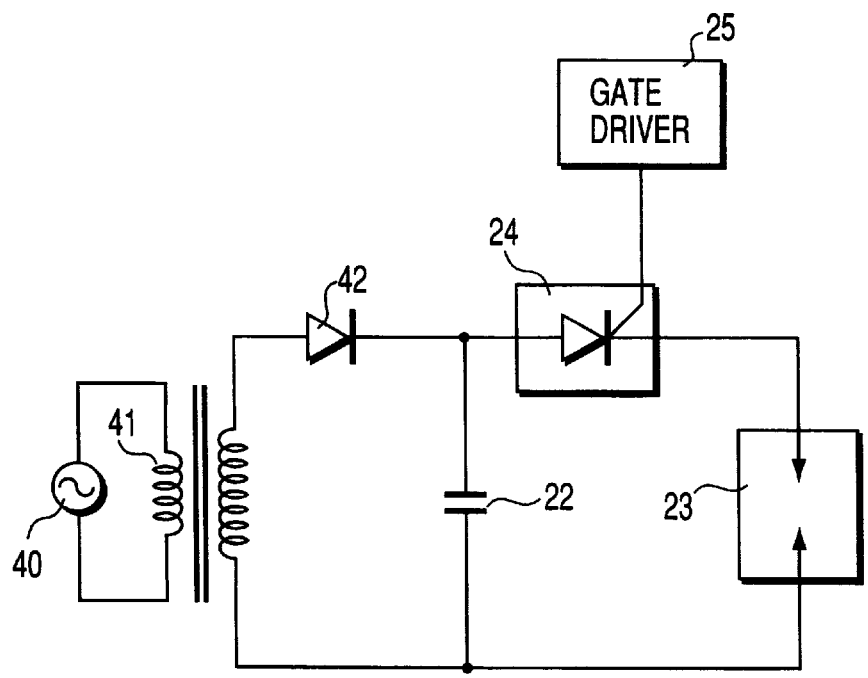
FIG. 7 is a circuit diagram showing an exhaust gas processing apparatus according to a second embodiment of the invention.

FIG. 7 is a circuit diagram showing an exhaust gas processing apparatus according to a second embodiment of the present invention. The structural elements identical or similar to those in the first embodiment are denoted by like reference numerals and a description thereof is omitted.

In the second embodiment, as shown in FIG. 7, an AC power is used as a supply power. A transformer 41 is connected to an AC generator 40, and a rectifying diode 42 is connected to the transformer 41. Accordingly, an AC power from the AC generator 40 is boosted by the transformer 41, rectified by the diode 42 and temporarily accumulated in the capacitor 22. The other structural and functional features are the same as those in the first embodiment, and a description thereof is omitted.

Thus, the apparatus of the second embodiment is applicable to an internal combustion engine such as a stationary generator for use in cogeneration power plants, other than the internal combustion engine for vehicles. In this case, the internal combustion engine may be either a gasoline engine or a diesel engine.

The present invention is applicable to, in addition to the above-described embodiments and applied example, low-temperature exhaust gas processing apparatuses for use in chemical factories and semiconductor factories, which are not provided with generators and require supply of external power.

As has been described above, according to the inventions based the aspects of the first and second embodiments, the MAGT is used for the short-pulse high-repetition switching element and the life thereof is made longer. Moreover, the power supply circuit is entirely composed of solid-state elements, a small-sized, highly reliable device is provided. Accordingly, the power supply circuit can be applied to a vehicle having only a limited installation space and suffering great vibrations.

Where the invention is applied to a thermal power plant, a vehicle or a generator, a high purification performance can be attained even at the time of the start of operation when the temperature of exhaust gas is low.

Figure 8:
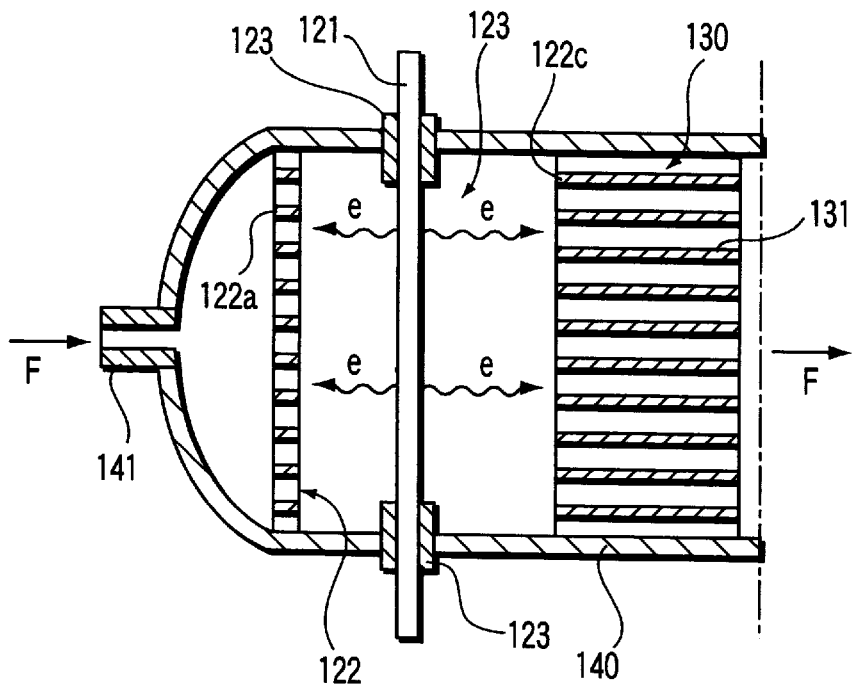
FIG. 8 is a vertical cross-sectional view showing an exhaust gas processing apparatus according to a third embodiment of the invention.
Figure 9:
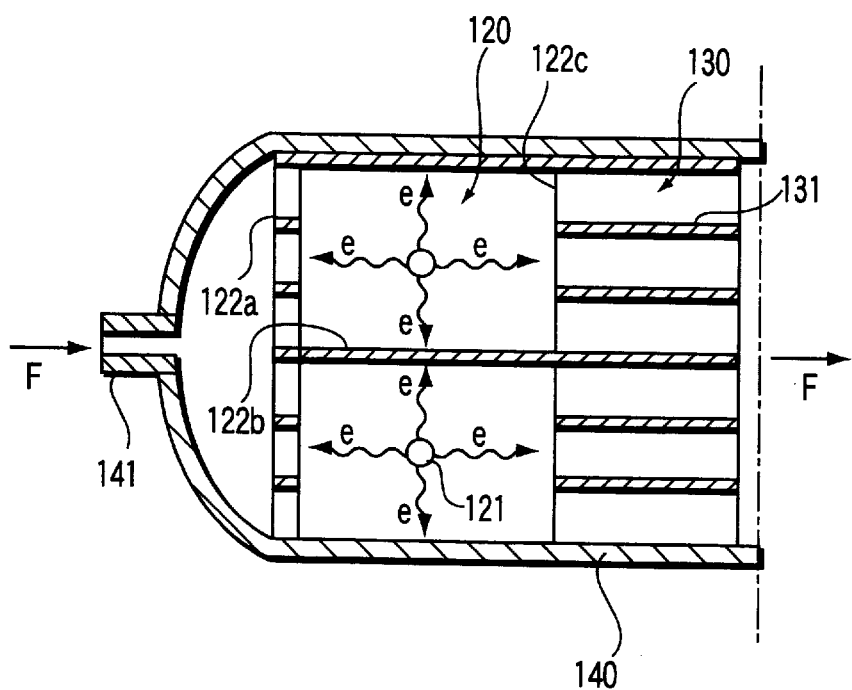
FIG. 9 is a transverse cross-sectional view of the exhaust gas processing apparatus shown in FIG. 8.
Figure 10:
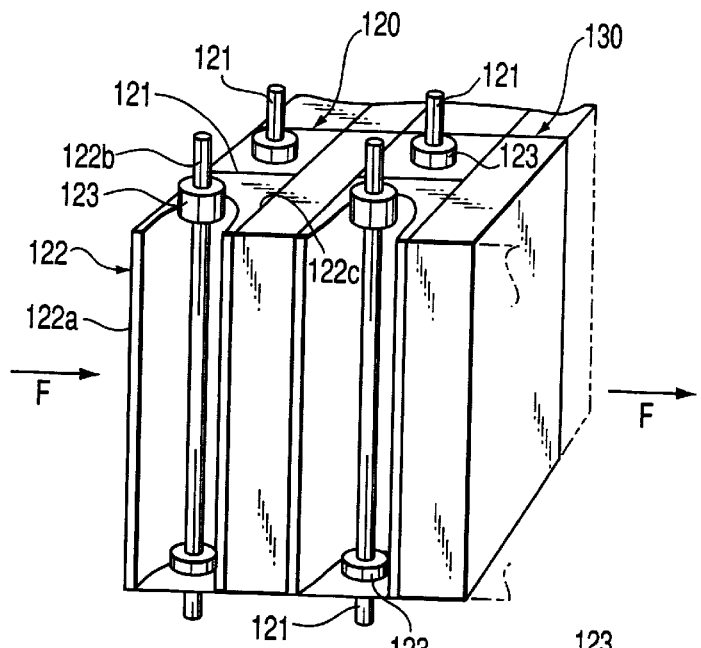
FIG. 10 is a perspective view showing a corona discharge section and a catalyst section shown in FIG. 8.
Figure 11:
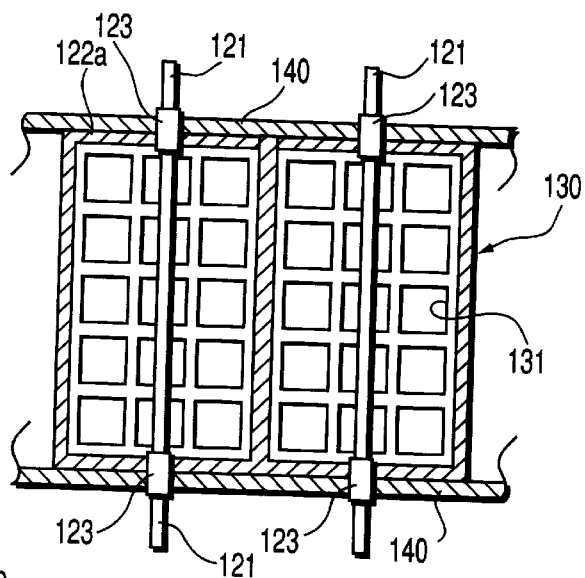
FIG. 11 is a cross-sectional view showing an exhaust gas outlet/inlet shown in FIG. 8.

FIG. 8 is a vertical cross-sectional view showing an exhaust gas processing apparatus according to a third embodiment of the present invention, FIG. 9 is a transverse cross-sectional view of the exhaust gas processing apparatus shown in FIG. 8, FIG. 10 is a perspective view showing a corona discharge section and a catalyst section shown in FIG. 8, and FIG. 11 is a cross-sectional view showing an exhaust gas inlet and outlet.

As is shown in FIGS. 8 and 9, the exhaust gas processing apparatus of this embodiment mainly includes a corona discharge section 120 and a catalyst section 130 provided downstream of the corona discharge section 120 in the direction F of flow of exhaust gas. The corona discharge section 120 has high-voltage electrodes 121 having hollow-cylindrical shapes, which are high-voltage side discharge electrodes. Several tens of high-voltage electrodes 121 are arranged at predetermined intervals in a direction perpendicular to the direction F of flow of exhaust gas. Lead wires (not shown) are connected to end portions of the high-voltage electrodes 121, and a DC high voltage is applied via the lead wires.

As is shown in FIG. 10, ground electrodes 122 are provided on four sides of each high-voltage electrode 121. The ground electrodes 122 consists of three kinds of electrodes. The ground electrode 122a is a ground electrode provided at the exhaust gas inlet/outlet in a direction perpendicular to the direction F of flow of exhaust gas. The ground electrode 122b is a ground electrode provided between high-voltage electrodes 121. Since no exhaust gas passes through the ground electrode 122b, it has no opening. The ground electrode 122c is a ground electrode provided on the surface of the catalyst section 130. Where a catalyst carrier 131 of the catalyst section 130 is formed of a metal, e.g. stainless steel or electrically conductive ceramics, the catalyst carrier 131 itself serves as a ground electrode. Thus, in the corona discharge section 120, a corona discharge is caused among the high-voltage electrode 121 and ground electrodes 122 to activate exhaust gas.

In order to achieve a uniform discharge among the high-voltage electrode 121 and all the four-side ground electrodes 122, it is preferable to set an equal distance between the high-voltage electrode 121 and each of the four-side ground electrodes 122. Accordingly, the ground electrodes 122 are arranged in a square in plan view, and the high-voltage electrode 121 is positioned at the center of the square.

As is shown in FIG. 11, the catalyst section 130 includes catalyst carriers 131 arranged in a lattice. The exhaust gas activated by the discharge caused by the corona discharge section 120 is purified in the catalyst section 130 in chemical reactions.

Insulators 123 serving as electrode supports, which are formed of a refractory material such as ceramics, are fitted at positions near both end portions of each high-voltage electrode 121, and the high-voltage electrode 121 is fixed to a housing 140 with the insulators 123 interposed. An inlet portion 141 and an outlet portion (not shown) are formed at the housing 140. The corona discharge section 120 and catalyst section 130 are surrounded by the housing 140.

The housing 140 is formed of an electromagnetic shield member which is formed by laminating a magnetic shield material such as a steel plate, a pig-iron plate, a silicon steel plate, a permalloy plate or an amorphous alloy plate, and a high electrical conductivity material such as a copper plate or an aluminum plate.

In the following description, a combination of the corona discharge section 120 and catalyst section 130 is referred to as "one unit," and a plurality of such units are provided in this embodiment.

The operation of the present embodiment will now be described.

In chemical reactions such as exhaust gas purification reactions, electrons e are used in the reactions. If the electron temperature alone is raised, the reaction efficiency can be enhanced with lower energy. The exhaust gas processed by corona discharge in the corona discharge section 120 is set in a non-equilibrium state in which the electron temperature is higher than the atomic nucleus temperature, and this state is referred to as "activated state."

If the exhaust gas in the activated state is let into the catalyst section 130, a high purification performance is achieved. The electrons e, however, collide with atomic nuclei over and over and transfer their energy to the atomic nuclei. As a result, the electron temperature falls and the purification performance deteriorates.

Accordingly, it is necessary to let the electrons e in the highly activated state into the catalyst section 130. In order to activate the electrons e as high as possible, it is desirable to decrease to a minimum the distance between the high-voltage electrode 121 and the catalyst section 130. In the present embodiment, the distance between the high-voltage electrode 121 and the ground electrodes 122 is set at 1 cm or less.

In the above structure, exhaust gas from the engine of an automobile or from the boiler of a thermal power plant flows into the corona discharge section 120 from the inlet portion 141 provided at the housing 140 through the ground electrode 122a. A high voltage is then applied to the exhaust gas by the high-voltage electrode 121. The activated exhaust gas flows into the catalyst section 130 and purification reactions occur at the surface of catalyst in the catalyst section 130.

As has been described above, according to the present embodiment, the high-voltage electrodes 121 are arranged perpendicular to the direction F of flow of exhaust gas. Thus, unlike the prior art, the exhaust gas purification performance can be enhanced without prevention of exhaust gas flow by the electrode support member.

If the catalyst carrier 131 is formed of a metal such as stainless steel or electrically conductive ceramics, the catalyst carrier 131 itself can serve as a ground electrode. Thus, the ground electrode 122c and catalyst carrier 131 can be realized by one member.

Moreover, the housing 140 is formed of an electromagnetic shield member which is formed by laminating a magnetic shield material such as a steel plate, a pig-iron plate, a silicon steel plate, a permalloy plate or an amorphous alloy plate, and a high electrical conductivity material such as a copper plate or an aluminum plate. Accordingly, electromagnetic noise caused by the corona discharge section 120 can be reduced, and other electronic devices and the human body can be protected against electromagnetic noise.

In the above embodiment, the high-voltage electrodes 121 are arranged perpendicular to the direction F of flow of exhaust gas. However, the same advantage is obtained even if the high-voltage electrodes 121 are arranged oblique to the direction F of flow of exhaust gas. In this case, the high-voltage electrodes 121 need to be arranged in parallel.

In a modification of the third embodiment of the invention, a plurality of combinations of the corona discharge section 120 and catalyst section 130 in the third embodiment described with reference to FIG. 10 are connected in tandem and closely attached to each other.

Specifically, the exhaust gas activated by the corona discharge section 120 is purified by the catalyst section 130, but the purification performance per unit is limited. In order to obtained a specified purification performance, a number of combinations of the corona discharge section 120 and catalyst section 130 need to be connected in tandem.

For example, if the efficiency of removal of harmful substance from exhaust gas per unit is 10%, the efficiency of 90% is obtained by $$(1-0.1)^n < 0.1 \text{ (where, n>22)}$$

Accordingly, at least 22 units need to be connected in tandem.

In order to save the space occupied by the exhaust gas processing apparatus, it is preferable that the units connected in tandem be closely attached to one another.

In the third embodiment, the high-voltage electrodes 121 are arranged perpendicular to the direction F of flow of exhaust gas and thus the length of the corona discharge section 120 can be reduced. Accordingly, a great number of the units can be connected in tandem. For example, when the length of the corona discharge unit 120 is 1 cm and the length of the catalyst section 130 is 2 cm, the length of one unit is 3 cm. If the entire length of the reactor is 75 cm, 25 units can be connected in tandem.

The space which can be used for exhaust gas purification varies depending on whether it is mounted on a large-sized vehicle or a small-sized vehicle, or whether it is mounted on a stationary power plant. Generally speaking, in the case of a small-sized vehicle, the space is 1 m or less and 10 to 30 units can be connected in tandem.

According to the modification, a number of combinations of the corona discharge section 120 and catalyst section 130 are connected in tandem and closely attached to each other. Therefore, the space for installation can be reduced and the efficiency of removing harmful substance from exhaust gas can be greatly enhanced.

Figure 12:
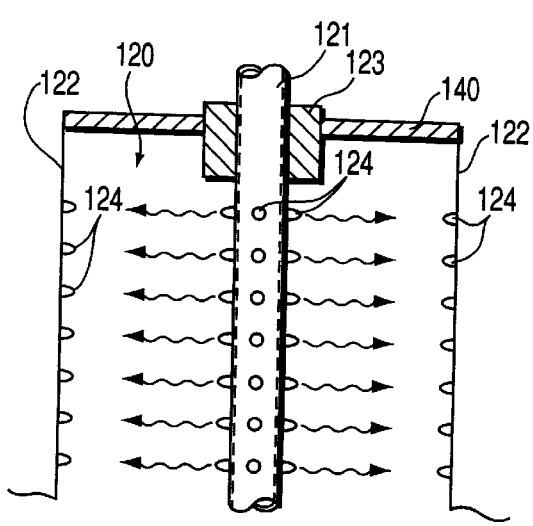
FIG. 12 is an enlarged view of a corona discharge section in an exhaust gas processing apparatus according to a fourth embodiment of the invention.

FIG. 12 is an enlarged view of a corona discharge section in an exhaust gas processing apparatus according to a fourth embodiment of the invention. The structural elements common to those in the third embodiment are denoted by like reference numerals and a description thereof is omitted.

In the fourth embodiment, as shown in FIG. 12, a number of small projections 124 are provided on the high-voltage electrode 121 and ground electrodes 122 of corona discharge section 120 in their axial directions. The height of each projection is 3 mm or less. The projections 124 are provided on four sides of the high-voltage electrode 121 which face the respective ground electrodes 122. On the other hand, the projections 124 are provided on one side of each ground electrode 122 which faces the high-voltage electrode 121.

The small projections 124 on the high-voltage electrode 121 can be formed by pressing, for example, a hollow cylinder, and the small projections 124 on the ground electrode 122 can be formed by pressing, for example, a flat plate. It is preferable that a distal end portion of each small projection 124 be formed in a semispherical shape in order to reduce wear by discharge.

Accordingly to this embodiment, a number of small projections 124 are formed on both the high-voltage electrode 121 and ground electrodes 122 in their axial direction. Thus, electric discharge can be produced uniformly in the entire space and stably maintained.

In this embodiment, the small projections 124 are formed on both the high-voltage electrode 121 and ground electrodes 122. However, the same advantage can be obtained even if the small projections 124 are formed on at least either the high-voltage electrode 121 or the ground electrodes 122.

As has been described above, according to the inventions based on the aspects of the third and fourth embodiments, there is provided the exhaust gas processing apparatus including the corona discharge section for activating exhaust gas by causing a corona discharge between the high-voltage electrode and ground electrodes, and the catalyst section for purifying the exhaust gas activated by the corona discharge section. Since the high-voltage electrode is disposed perpendicular to the direction of flow of exhaust gas, the purification performance can be enhanced even if the temperature of the exhaust gas is low. Thus, the exhaust gas purification performance in the thermal power plant or automobile at the time the temperature of the catalyst is low can be enhanced, and a contribution is made toward the protection of the environment.

Specifically, in the exhaust gas processing apparatus, the high-voltage electrode may be disposed perpendicular to the direction of flow of exhaust gas. The ground electrodes may be arranged along the axis of the high-voltage electrode to face the four sides of the high-voltage electrode.

In the exhaust gas processing apparatus, the catalyst section is disposed downstream of the corona discharge section in the direction of flow of exhaust gas and a plurality of combinations of the corona discharge section and catalyst section are connected in tandem and attached closely to one another. Thereby, the space for installation is reduced and the efficiency of removal of harmful substance from exhaust gas is greatly enhanced.

In the exhaust gas processing apparatus, the catalyst carrier in the catalyst section is formed of either a metal or electrically conductive ceramic material. Thereby, the catalyst carrier can also be used as the ground electrode.

In the exhaust gas processing apparatus, small projections are formed on at least either the high-voltage electrode or the ground electrodes. Thereby, electric discharge can be produced uniformly in the entire space and stably maintained.

In the exhaust gas processing apparatus, the corona discharge section and catalyst section are surrounded by the housing, and the housing is formed of an electromagnetic shield member formed by laminating a magnetic shield material and a high electrical conductivity material. Thereby, electromagnetic noise caused by the corona discharge section is reduced, and other electronic devices and the human body can be protected against electromagnetic noise.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas processing apparatus for removing a predetermined component contained in exhaust gas of an internal combustion engine, the apparatus comprising:
   a corona discharge tube in which the exhaust gas of the internal combustion engine is introduced;
   a switching element composed of a MOS Assisted Gate-Controlled Thyristor (MAGT) used for supplying supply power to the corona discharge tube; and
   means for controlling the switching element on the basis of an output signal from the internal combustion engine and a signal related to a temperature of an exhaust pipe of the internal combustion engine.

2. An exhaust gas processing apparatus according to claim 1, wherein said internal combustion engine is a Diesel engine.

3. An exhaust gas processing apparatus according to claim 1, wherein said internal combustion engine is a gasoline engine.

4. An exhaust gas processing apparatus for removing a predetermined component contained in exhaust gas of an internal combustion engine, the apparatus comprising:
   a corona discharge tube for causing a corona discharge between a high-voltage electrode and a ground electrode and activating the exhaust gas, the high-voltage electrode being disposed in a direction crossing a direction of flow of the exhaust gas, and said ground electrode being disposed in an axial direction of the high-voltage electrode on each of four sides of the high-voltage electrode; and
   a catalyst section for purifying the exhaust gas activated by the corona discharge section.

5. An exhaust gas processing apparatus according to claim 4, wherein said catalyst section is disposed downstream of the corona discharge section in the direction of the exhaust gas, and a plurality of combinations of the corona discharge section and the catalyst section are connected in tandem and attached to one another.

6. An exhaust gas processing apparatus according to claim 4, wherein a catalyst carrier in the catalyst section is formed of one of a metal and an electrically conductive ceramic material.

7. An exhaust gas processing apparatus according to claim 4, wherein a plurality of small projections are formed on at least one of the high-voltage electrode and the ground electrode.

8. An exhaust gas processing apparatus according to claim 4, wherein said corona discharge section and said catalyst section are surrounded by a housing, and the housing is formed of an electromagnetic shield member formed by laminating a magnetic shield material and electrical conductivity material.

* * * * *